US011987298B2

(12) United States Patent
Maegawa et al.

(10) Patent No.: US 11,987,298 B2
(45) Date of Patent: May 21, 2024

(54) MOTOR CONTROL DEVICE AND STEERING SYSTEM HAVING THE SAME

(71) Applicants: DENSO CORPORATION, Kariya (JP); TOYOTA JIDOSHA KABUSHIKI KAISHA, Toyota (JP); JTEKT CORPORATION, Kariya (JP)

(72) Inventors: Takuya Maegawa, Kariya (JP); Hiroki Tomizawa, Kariya (JP); Hiroyasu Otake, Kariya (JP); Yuuta Kajisawa, Okazaki (JP); Yuji Fujita, Okazaki (JP); Tokuaki Hibino, Toyota (JP); Yosuke Yamashita, Nagoya (JP); Atsushi Satou, Miyoshi (JP); Masaharu Yamashita, Toyota (JP)

(73) Assignees: DENSO CORPORATION, Kariya (JP); TOYOTA JIDOSHA KABUSHIKI KAISHA, Toyota (JP); JTEKT CORPORATION, Kariya (JP)

(*) Notice: Subject to any disclaimer, the term of this patent is extended or adjusted under 35 U.S.C. 154(b) by 230 days.

(21) Appl. No.: 17/657,666

(22) Filed: Apr. 1, 2022

(65) Prior Publication Data

US 2022/0315099 A1 Oct. 6, 2022

(30) Foreign Application Priority Data

Apr. 6, 2021 (JP) ................................. 2021-064961

(51) Int. Cl.
*B62D 5/04* (2006.01)
*H02K 7/00* (2006.01)
(Continued)

(52) U.S. Cl.
CPC ......... *B62D 5/0484* (2013.01); *B62D 5/0424* (2013.01); *B62D 5/046* (2013.01);
(Continued)

(58) Field of Classification Search
None
See application file for complete search history.

(56) References Cited

U.S. PATENT DOCUMENTS 7,863,845 B2 * 1/2011 Kasai ..................... B62D 5/046
  318/440
10,252,745 B2 * 4/2019 Nampei ................. B62D 5/049
(Continued)

FOREIGN PATENT DOCUMENTS

CN 107878554 B * 6/2021 ........... B62D 5/0463
CN 115313946 A * 11/2022 ........... B62D 5/0424
(Continued)

*Primary Examiner* — Kevin R Steckbauer
(74) *Attorney, Agent, or Firm* — MASCHOFF BRENNAN

(57) ABSTRACT

A main power supply having a large capacity and a backup power supply having a small capacity are switchable by a power supply switching determination unit in a system. A motor control device drives a motor by the main power supply or the backup power supply. A drive control unit outputs a drive signal, calculated by feedback control of the current detection value with respect to the current command value, to an inverter circuit. When the power supply switching determination unit switches from the main power supply to the backup power supply, the drive control unit moves from a normal control using the main power supply to a backup control that restricts an electric power consumption and prevents the backup power supply from stopping.

12 Claims, 9 Drawing Sheets

(51) Int. Cl.
*H02P 21/00* (2016.01)
*H02P 21/22* (2016.01)
*H02P 27/08* (2006.01)
*H02P 27/12* (2006.01)
*H02P 29/024* (2016.01)
*H02P 29/028* (2016.01)
*H02P 29/032* (2016.01)

(52) U.S. Cl.
CPC ......... *B62D 5/0463* (2013.01); *B62D 5/0496* (2013.01); *H02K 7/003* (2013.01); *H02P 21/0089* (2013.01); *H02P 21/22* (2016.02); *H02P 27/085* (2013.01); *H02P 27/12* (2013.01); *H02P 29/025* (2013.01); *H02P 29/028* (2013.01); *H02P 29/032* (2016.02); *B62D 5/0481* (2013.01)

(56) References Cited

U.S. PATENT DOCUMENTS

| | | | | |
|---|---|---|---|---|
| 10,293,851 | B2* | 5/2019 | Ukai | B62D 5/0493 |
| 10,752,283 | B2* | 8/2020 | Nagashima | H02P 25/22 |
| 11,012,010 | B2* | 5/2021 | Suzuki | H02P 21/22 |
| 11,736,049 | B2* | 8/2023 | Kitagawa | H02P 21/22 318/496 |
| 2008/0277191 | A1* | 11/2008 | Kasai | B62D 5/046 180/444 |
| 2009/0140673 | A1* | 6/2009 | Kasai | H02J 1/08 318/139 |
| 2015/0035464 | A1* | 2/2015 | Maekawa | H02M 7/5387 318/400.21 |
| 2015/0251690 | A1* | 9/2015 | Yamamoto | B62D 5/046 180/446 |
| 2016/0297471 | A1* | 10/2016 | Yamanaka | B62D 5/0463 |
| 2017/0369094 | A1* | 12/2017 | Ukai | B62D 5/0487 |
| 2018/0091081 | A1* | 3/2018 | Suzuki | H02P 6/28 |
| 2018/0093702 | A1* | 4/2018 | Nampei | B62D 5/0487 |
| 2018/0194389 | A1* | 7/2018 | Imamura | B62D 5/0469 |
| 2020/0076335 | A1* | 3/2020 | Suzuki | H02P 21/22 |
| 2020/0252015 | A1* | 8/2020 | Suzuki | H02P 29/032 |
| 2021/0214000 | A1* | 7/2021 | Miki | H02P 21/06 |
| 2022/0315099 | A1* | 10/2022 | Maegawa | H02P 29/025 |
| 2022/0393627 | A1* | 12/2022 | Kitagawa | H02M 7/53871 |
| 2023/0116678 | A1* | 4/2023 | Suzuki | B62D 5/046 318/496 |
| 2023/0208342 | A1* | 6/2023 | Liu | H02P 21/22 310/154.01 |

FOREIGN PATENT DOCUMENTS

| | | | | |
|---|---|---|---|---|
| CN | 115461982 | A * | 12/2022 | B62D 5/0409 |
| CN | 117178471 | A * | 12/2023 | |
| DE | 102017216921 | A1 * | 3/2018 | B62D 5/0463 |
| DE | 102019123091 | A1 * | 3/2020 | B62D 5/046 |
| EP | 4068611 | A1 * | 10/2022 | H02M 1/0009 |
| JP | 2020036508 | A * | 3/2020 | B62D 5/046 |
| JP | 2021197866 | A * | 12/2021 | B62D 5/0409 |
| JP | 2022160301 | A * | 10/2022 | B62D 5/0424 |
| JP | 7230886 | B2 * | 3/2023 | B62D 5/0409 |
| JP | 2023070085 | A * | 5/2023 | |
| WO | WO-2017026261 | A1 * | 2/2017 | B62D 5/0409 |
| WO | WO-2021256312 | A1 * | 12/2021 | B62D 5/0409 |

* cited by examiner

MOTOR CONTROL DEVICE AND STEERING SYSTEM HAVING THE SAME

CROSS REFERENCE TO RELATED APPLICATION

The present application claims the benefit of priority from Japanese Patent Application No. 2021-064961 filed on Apr. 6, 2021. The entire disclosure of the above application is incorporated herein by reference.

TECHNICAL FIELD

The present disclosure relates to a motor control device and a steering system having a motor control device.

BACKGROUND

Conventionally, in a system configured to switch between a main power supply and a backup power supply, a device for driving a motor using the power of the main power supply or the backup power supply is known.

For example, in the electric power steering device according to a conceivable technique, when the motor is driven by using the backup power supply, the electric power steering device increases the d-axis current of the field weakening control as compared with the case where the main power supply is used, and suppresses the reduction of the motor rotation speed due to the voltage drop.

Further, conventionally, a motor control device that limits the power supply current flowing from the power supply to the inverter circuit to be equal to or less than an upper limit value is known. For example, the motor control device according to a conceivable technique is applied to the drive of an IPM motor. This motor control device calculates the q-axis current limit value based on the voltage command value, the current detection value, and the target power supply current, and further restricts the torque current command value in proportional to the torque of the motor using the torque current limit value converted from the q-axis current limit value.

SUMMARY

According to an example, a main power supply having a large capacity and a backup power supply having a small capacity are switchable by a power supply switching determination unit in a system. A motor control device drives a motor by the main power supply or the backup power supply. A drive control unit outputs a drive signal, calculated by feedback control of the current detection value with respect to the current command value, to an inverter circuit. When the power supply switching determination unit switches from the main power supply to the backup power supply, the drive control unit moves from a normal control using the main power supply to a backup control that restricts an electric power consumption and prevents the backup power supply from stopping.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
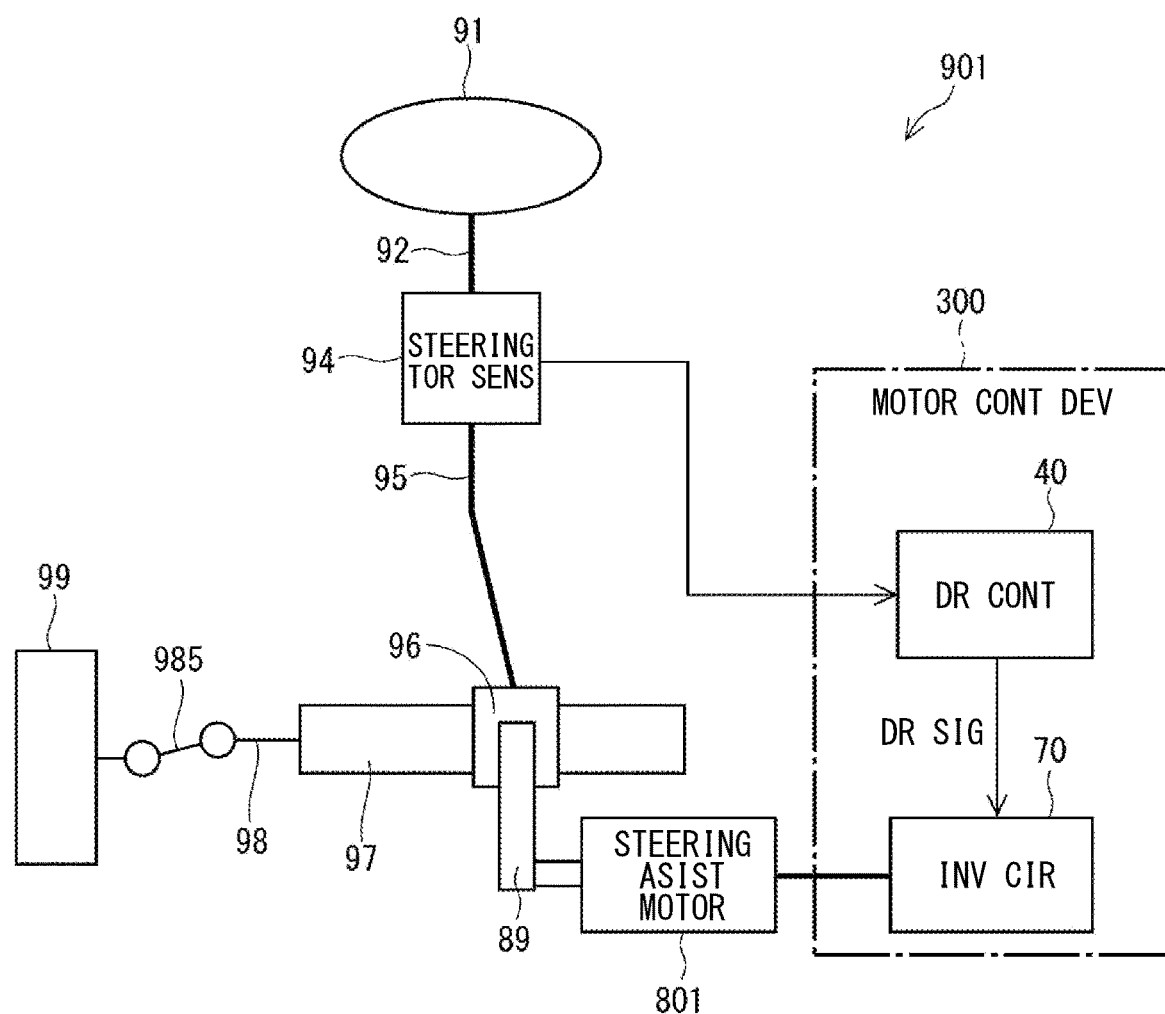
FIG. 1 is a schematic view of an electric power steering system.

The backup power supply is an emergency sub-battery used when the main power supply fails. The backup power supply is required to be compact and inexpensive as compared with the main power supply (for example, a lead battery). On the contrary, the backup power supply has a small capacity. Therefore, when the backup power supply is used, if the power supply current overshoots instantaneously and the electric power exceeding the output upper limit is output, the backup power supply is stopped and the motor output function is lost. For example, in an electric power steering system, there may be a difficulty that, when the backup power supply is stopped, the driving of the steering assist motor is stopped and the assist function is lost. A conceivable technique does not describe anything about the difficulty.

The present embodiments are provided in view of these points, and an object thereof is to provide a motor control device for avoiding a loss of motor output function due to a stop of the backup power supply when the motor is driven by using the backup power supply.

In the motor control device of the present embodiments, a system is configured to be switchable between a main power supply, which is a DC power supply having a relatively large capacity, and a backup power supply, which is a DC power supply having a relatively small capacity, using a power supply switching determination unit. The system drives a motor by the electric power of the main power supply or the backup power supply.

This motor control device includes an inverter circuit and a drive control unit. The inverter circuit converts DC power from the main power supply or the backup power supply into AC power and supplies it to the motor. The drive control unit outputs a drive signal, calculated by feedback control of the current detection value with respect to the current command value, to the inverter circuit.

The drive control unit includes a current detection value conversion unit, a voltage command value calculation unit, and a voltage command upper limit guard unit. The current detection value conversion unit performs coordinate conversion of the detection value of the phase current flowing from the inverter circuit to the motor, and calculates the d-axis current detection value and the q-axis current detection value.

The voltage command value calculation unit calculates the voltage command value applied to the inverter circuit or its correlation values, which are the d-axis voltage command value and the q-axis voltage command value, so that the d-axis current detection value and the q-axis current detection value follow the d-axis current command value and the q-axis current command value, respectively. The voltage command upper limit guard unit guards the upper limit of the absolute value of the d-axis voltage command value and the q-axis voltage command value by the voltage command upper limit guard value.

When the power supply switching determination unit switches from the main power supply to the backup power supply, the drive control unit moves from "a normal control" that is executed when the main power supply is used to "a backup control" that limits the power consumption and prevents the backup power supply from stopping. Therefore, the motor control device of the present embodiments can avoid the loss of the motor output function due to the stoppage of the backup power supply. Further, in the system to which the motor control device of the present embodiments is applied, backup control can be realized with a low-capacity backup power supply, so that the size and cost of the backup power supply can be reduced.

Further, the present embodiments provide a steering system including: a steering assist motor that outputs steering assist torque; a reaction force motor that outputs reaction force torque for the driver's steering; and a turning motor that turns tires. The motor control device controls the drive of at least one of a steering assist motor, a reaction force motor, and a turning motor as a motor. In a steering system that requires high reliability, the effect of the motor control device is particularly effectively exhibited.

Hereinafter, a motor control device according to a plurality of embodiments of the present disclosure will be described with reference to the drawings. The motor control device of each embodiment is applied to the steering system of the vehicle, and controls the drive of the steering assist motor, the reaction force motor, and the turning motor. Further, the first embodiment targets the IPM motor as a drive target, and the second embodiment targets the SPM motor as a drive target. In the following description, first and second embodiments are collectively referred to as a present embodiment.

[Steering System]

Figure 2:
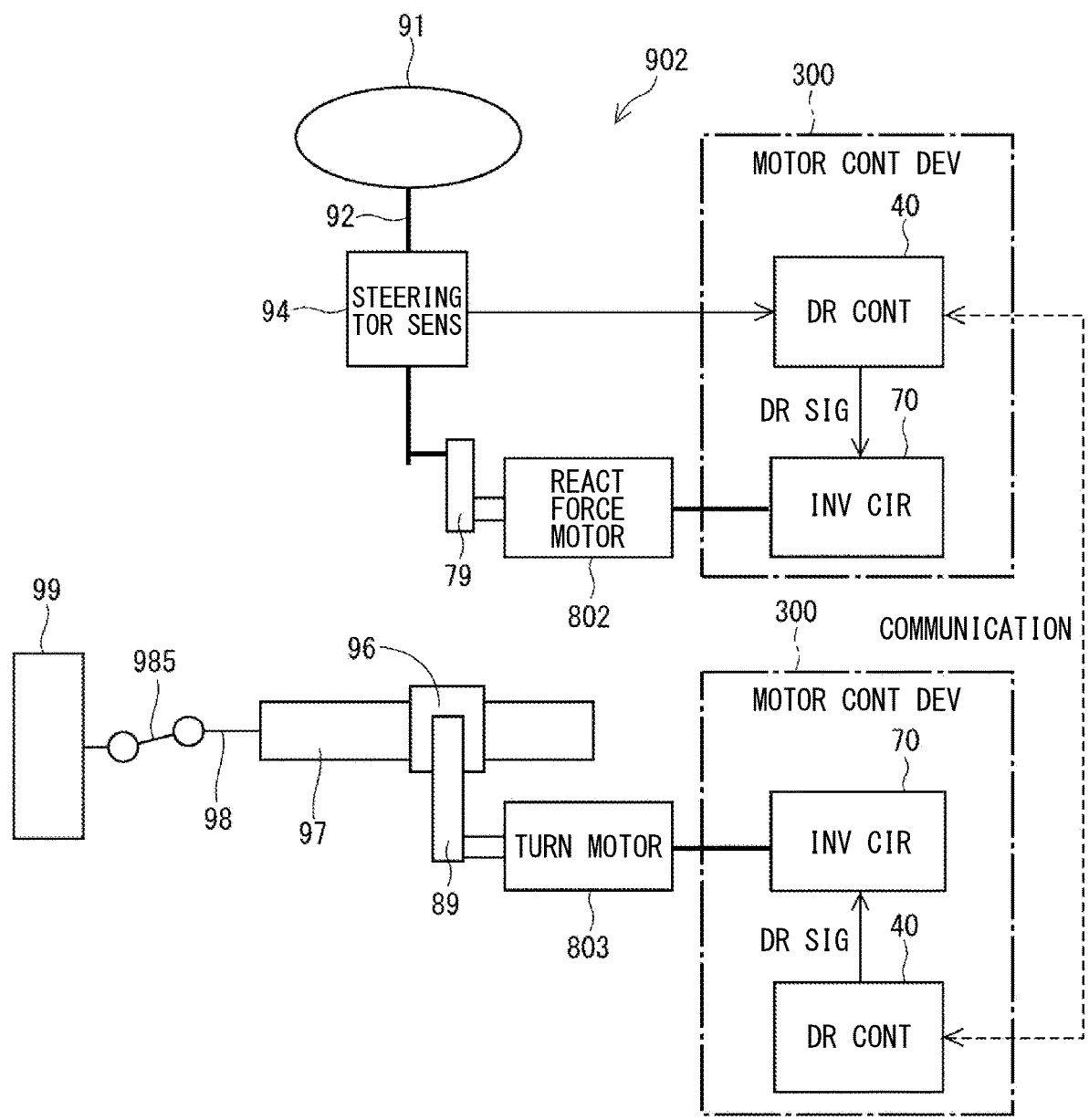
FIG. 2 is a schematic configuration diagram of a steering-by-wire system.

With reference to FIGS. 1 and 2, a schematic configuration of an electric power steering system (hereinafter, "EPS system") and a steer-by-wire system (hereinafter, "SBW system") will be described as steering systems. In FIGS. 1 and 2, the tire 99 on only one side is shown, and the tire on the opposite side is not shown.

FIG. 1 shows the overall configuration of the EPS system 901 in which the steering mechanism and the turning mechanism are mechanically coupled. Although FIG. 1 shows a rack-assist type EPS system, the same applies to a column-assist type EPS system. In the EPS system 901, the steering shaft 92 and the rack 97 are connected by an intermediate shaft 95.

When the driver operates the steering wheel 91, the rotational movement of the steering shaft 92 is transmitted to the pinion gear 96 via the intermediate shaft 95. The rotational motion of the pinion gear 96 is converted into a linear motion of the rack 97, and the tie rods 98 provided at both ends of the rack 97 reciprocate the knuckle arm 985 to turn the tire 99.

The EPS system 901 includes a steering torque sensor 94, a motor control device 300, a steering assist motor 801 and the like. The steering torque sensor 94 is provided at an intermediate portion of the steering shaft 92 to detect a steering torque applied by the driver. The motor control device 300 includes a drive control unit 40 and an inverter circuit 70. The drive control unit 40 calculates a drive signal to be output to the inverter circuit 70 based on the steering torque and the like. The steering assist torque output by the steering assist motor 801 by supplying electric power from the inverter circuit 70 is transmitted to the rack 97 via the reduction gear 89.

FIG. 2 shows the overall configuration of the SBW system 902 in which the steering mechanism and the turning mechanism are mechanically separated. In the SBW system 902, the steering shaft 92 and the rack 97 are separated. A reaction force motor 802 that outputs a reaction force torque with respect to the steering of the driver is provided on the steering shaft 92 side. The reaction force torque generated by the reaction force motor 802 is transmitted to the steering shaft 92 via the reduction gear 79. On the rack 97 side, a turning motor 803 for linearly moving the rack 97 to turn the tire 99 is provided. The torque of the turning motor 803 is transmitted to the tire 99 via the reduction gear 89.

A motor control device 300 including a drive control unit 40 and an inverter circuit 70 is provided for each of the reaction force motor 802 and the turning motor 803. The drive control unit 40 of the reaction force motor 802 and the drive control unit 40 of the steering motor 803 communicate with each other, and calculates the drive signal to be output to a corresponding inverter circuit 70 so that the reaction force motor 802 and the steering motor 803 operate in cooperation with each other.

Figure 3:
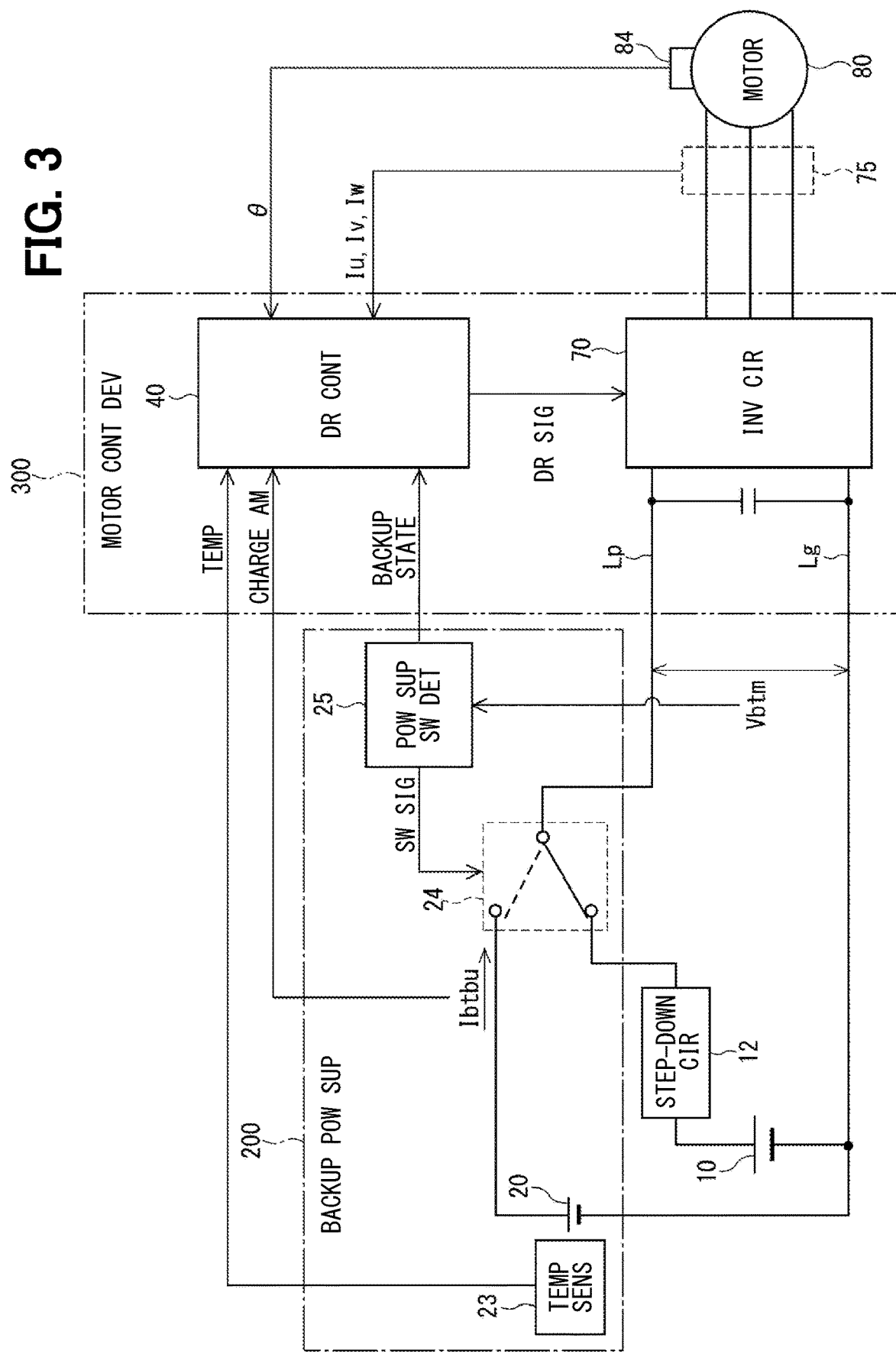
FIG. 3 is a block diagram showing a power supply configuration of a system to which a motor control device is applied.

In this embodiment, a three-phase brushless motor is used for all of the steering assist motor 801 of the EPS system 901, the reaction force motor 802 and the steering motor 803 of the SBW system 902. The motor of the first embodiment is an IPM motor, that is, an embedded permanent magnet type synchronous motor having a salient polarity. The motor of the second embodiment is an SPM motor, that is, a surface permanent magnet type synchronous motor. Each of the motors 801, 802, and 803 may be configured as a mechanical/electrical integrated motor in which the motor control device 300 is integrally formed. In FIG. 3 and below, the motors 801, 802, and 803 are collectively referred to as "motor 80".

[System Power Supply Configuration]

Next, with reference to FIG. 3, the power supply configuration of the system to which the motor control device 300 is applied will be described. This system includes a main power supply 10 which is a DC power supply having a relatively large capacity, and a backup power supply 20 which is a DC power supply having a relatively small capacity. The backup power supply is an emergency sub-battery used when the main power supply fails. As for the power supply voltage, as referred to in Patent Literature 1 (JP-2007-326379-A, corresponding US publication: US2008/0277191 A1), which are incorporated herein by reference, the main power supply 10 is a high-voltage battery of several hundred volts, and the backup power supply 20 is a low voltage battery of 12 volts or the like. Alternatively, both the main power supply 10 and the backup power supply 20 may be low-voltage batteries of about 12 V.

The backup power supply device 200 includes a backup power supply 20, a temperature sensor 23, a switch 24, and a power supply switching determination unit 25. The positive electrode of the main power supply 10 is connected to one of the input terminals of the 2-input/1-output type switch 24 via the step-down circuit 12 as needed. The positive electrode of the backup power supply 20 is connected to the other input terminal of the switch 24. The high potential line Lp of the inverter circuit 70 is connected to the output terminal of the switch 24. The low potential line Lg of the inverter circuit 70 has the same potential as the negative electrodes of the main power supply 10 and the backup power supply 20.

When the main power supply 10 is normal, the input side of the switch 24 is connected to the main power supply 10. The power supply switching determination unit 25 monitors the power supply voltage Vbtm of the main power supply 10, and when the power supply voltage Vbtm falls below a predetermined threshold value due to the failure of the main power supply 10, the power supply switching determination unit 25 outputs a switching signal to the switch 24 to switch the input side to be connected to the backup power supply 20. As described above, the system is configured so that the main power supply 10 and the backup power supply 20 can be switched by the power supply switching determination unit 25.

The motor control device 300 includes an inverter circuit 70 and a drive control unit 40, and drives the motor 80 using the DC power of the main power supply 10 or the backup power supply 20. The inverter circuit 70 includes a plurality of switching elements of upper and lower arms connected by a bridge, and a smoothing capacitor provided at an input portion. The inverter circuit 70 converts DC power from the main power supply 10 or the backup power supply 20 into AC power and supplies it to the motor 80.

The drive control unit 40 outputs a drive signal, calculated by feedback control of the current detection value with respect to the current command value, to the inverter circuit 70. The drive control unit 40 includes a microcomputer, a pre-driver, and the like, and has a CPU (not shown), a ROM, a RAM, an I/O, a bus line connecting these configurations, and the like. The drive control unit 40 executes software processing by executing a program stored in advance by the CPU, and control by hardware processing by a dedicated electronic circuit.

Further, a current sensor 75 for detecting the phase current flowing from the inverter circuit 70 to the motor 80 and a rotation angle sensor 84 for detecting the electric angle θ of the motor 80 are provided. The current sensor 75 may detect the three-phase currents Iu, Iv, and Iw, or the currents of two of the three phases may be detected and the current of the remaining one phase may be calculated by Kirchhoff's law. The arrangement of the current sensor 75 is not limited to the power path between the inverter circuit 70 and the motor 80 as shown in the drawings, and may be arranged inside the inverter circuit 70. The three-phase currents Iu, Iv, Iw and the electric angle θ are acquired by the drive control unit 40.

Further, when the power supply switching determination unit 25 switches from the main power supply 10 to the backup power supply 20, the power supply switching determination unit 25 notifies the drive control unit 40 that the backup state is in effect. Hereinafter, in the drive control unit 40, the control executed when the main power supply 10 is used is referred to as "normal control", and the control executed when the backup power supply 20 is used is referred to as "backup control". Upon receiving the notification of the backup status, the drive control unit 40 shifts from the normal control to the backup control.

During backup control, the drive control unit 40 acquires information on the charge amount and temperature of the backup power supply 20 from the backup power supply device 200. The charge amount of the backup power supply 20 is determined based on, for example, the power supply current Ibtbu flowing from the backup power supply 20 to the inverter circuit 70. The temperature of the backup power supply 20 is detected by, for example, a temperature sensor 23 installed in the vicinity of the backup power supply 20. Not limited to the dedicated temperature detection value, the detection value of the outside air temperature or the ambient temperature may be diverted.

The charge amount is not limited to a continuous value, and may be acquired as a multi-step charge amount level such as "levels 0, 1, 2, and 3". For example, level 0 is defined as a charge rate of 0% to 25%, and level 1 is defined as a charge rate of 25% to 50%. The temperature may be acquired as a low temperature flag that is turned on when the temperature is below a predetermined temperature, for example, based on the temperature dependence of the power supply characteristics.

Figure 4:
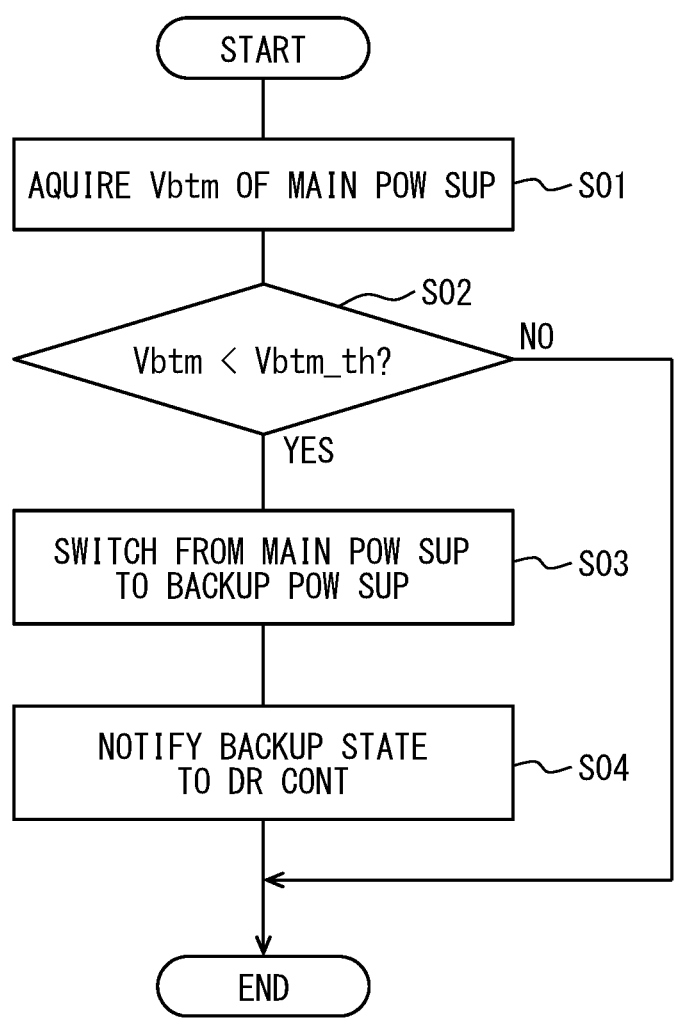
FIG. 4 is a flowchart of a power supply switching determination process in the system of FIG. 3.

The power supply switching determination process will be described with reference to the flowchart of FIG. 4. In the description of the flowchart, a symbol "S" indicates a step. In S01, the power supply switching determination unit 25 acquires the power supply voltage Vbtm of the main power supply 10. In S02, it is determined whether the power supply voltage Vbtm is below the threshold value Vbtm_th. When YES in S02, the power switching determination unit 25 outputs a switching signal to the switch 24 in S03 to switch from the main power supply 10 to the backup power supply 20. Further, in S04, the power supply switching determination unit 25 notifies the drive control unit 40 that the backup state is in effect.

Here, since the capacity of the backup power supply 20 is small, when the backup power supply 20 is used, and the power supply current exceeds the output upper limit due to momentary overshoot, the backup power supply 20 is stopped and the output function of the motor 80 may be lost. For example, in the EPS system, there may be a difficulty that, when the backup power supply 20 is stopped, the driving of the steering assist motor may be stopped and the assist function may be lost.

Therefore, when the backup power supply 20 is used, the motor control device 300 of the present embodiment performs backup control, which is "control to limit the power consumption and prevent the backup power supply 20 from stopping". In other words, the "backup control" in the present embodiment means "control that limits the power consumption and prevents the backup power supply 20 from stopping". Specifically, the motor control device 300 limits electric power in a plurality of control blocks of the drive control unit 40.

[Drive Control Unit]

Subsequently, the detailed configuration of the drive control unit 40 will be described in order by dividing it into a first embodiment in which the IPM motor is the drive target and a second embodiment in which the SPM motor is the drive target. In the IPM motor, in addition to the magnet torque as the motor torque, reluctance based on the difference between the d-axis inductance and the q-axis inductance is generated. On the other hand, a general SPM motor does not generate reluctance torque. Reluctance torque is exceptionally generated in the inset type SPM motor having a salient polarity. In the present disclosure, the inset type SPM motor is treated as being included in the IPM motor.

Based on this characteristic difference, the drive control unit 40 has a different configuration particularly relating to the calculation of the q-axis current command value. Hereinafter, the drive control unit 401 for the IPM motor will be described as the first embodiment, and the drive control unit 402 for the SPM motor will be described as the second embodiment. Common matters will be described in the description of the first embodiment. In particular, for the control configuration for the IPM motor, FIGS. 2, 3, 4 and the like of Patent Literature 2 (JP-2020-127346-A, corresponding US Publication: US2020/0252015 A1) are referred to and incorporated herein by reference.

First Embodiment

Figure 5:
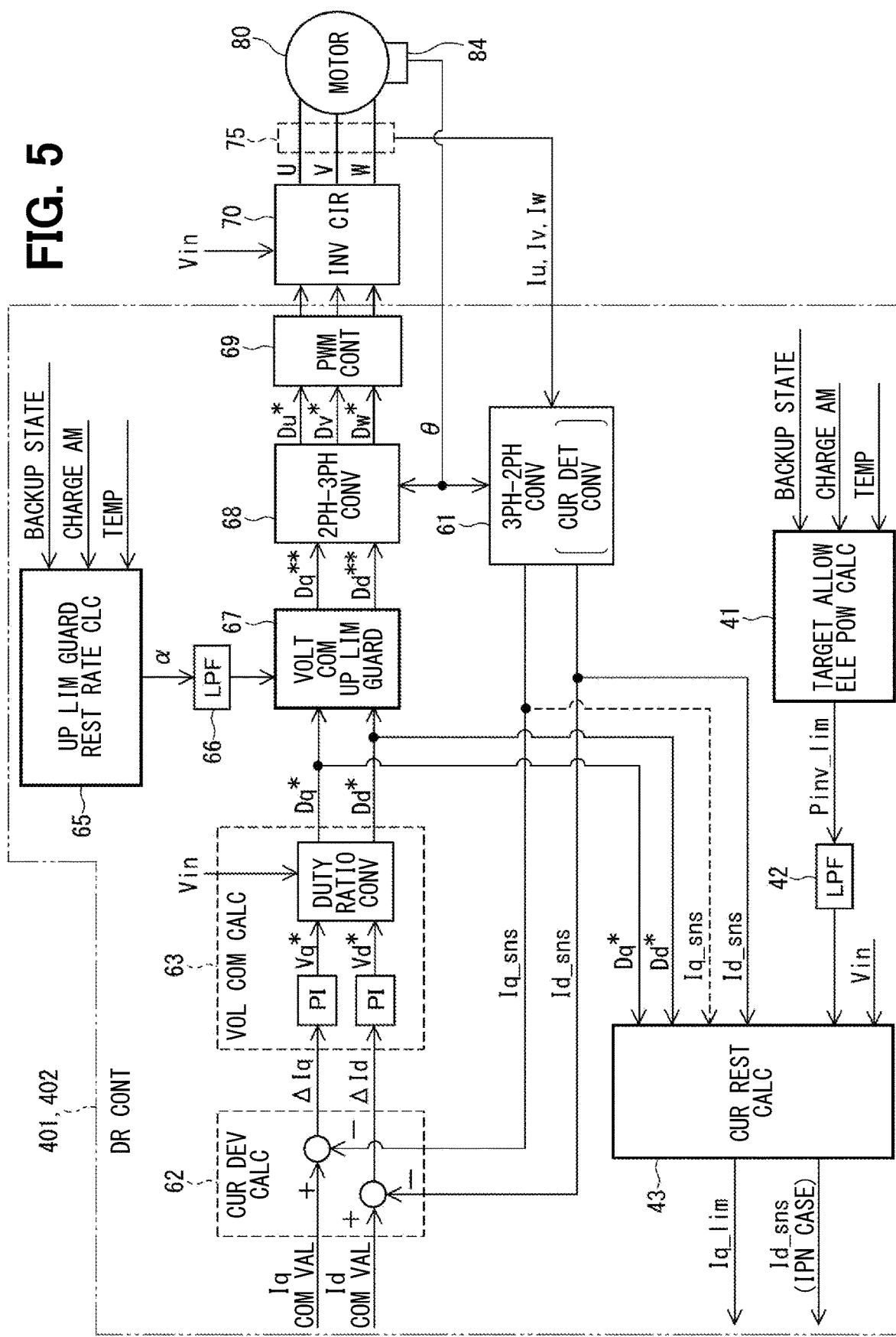
FIG. 5 is a block diagram of a feedback control unit common to the drive control units of the first and second embodiments.

Firstly, the first embodiment will be described with reference to FIG. 5 to FIG. 9. First, with reference to FIG. 5, a control configuration common to the drive control units 401 and 402 of the first and second embodiments will be described. The common part is mainly a configuration related to current feedback control by vector control, and has a configuration of backup control peculiar to the present embodiment in addition to the configuration of normal control. In the description of FIG. 5, the reference numeral of the drive control unit is referred to as "401".

The drive control unit 401 acquires the detection values of the phase currents Iu, Iv, and Iw detected by the current sensor 75, and the electric angle θ of the motor 80 detected by the rotation angle sensor 84. Further, the drive control unit 401 acquires the inverter input voltage Vin from a voltage sensor or the like (not shown). The drive control unit 401 drives the inverter circuit 70 by feedback control based on these information. Further, the drive control unit 401 acquires the backup status notification signal, the charge amount of the backup power supply 20, and the temperature information.

The drive control unit 401 has a three-phase two-phase conversion unit 61, a current deviation calculation unit 62, a voltage command value calculation unit 63, a voltage command upper limit guard unit 67, a two-phase three-phase conversion unit 68, and a PWM control unit 69, a target allowable electric power calculation unit 41, and a current limit value calculation unit 43 as a normal control configuration. Basically, vector control is performed using dq-axis coordinates, "current" and "voltage" mean dq-axis current and dq-axis voltage.

The three-phase two-phase conversion unit 61 as the "current detection value conversion unit" converts the detection values Iu, Iv, and Iw of the phase current detected by the current sensor 75 into three-phase two-phase coordinates using the electric angle θ, so that the d-axis current detection value Id_sns and the q-axis current detection value Iq_sns are calculated.

The current deviation calculation unit 62 calculates the current deviations ΔId and ΔIq from the input d-axis current command value ("Id command value" in the drawing) and the q-axis current command value ("Iq command value" in the drawing) to the dq-axis current detection values Id_sns and Iq_sns that are feedback from the three-phase two-phase conversion unit 61. Here, since the specific symbols of the Id command value and the Iq command value are different between the drive control unit 401 of the first embodiment and the drive control unit 402 of the second embodiment, the symbols are not used in FIG. 5.

The voltage command value calculation unit 63 performs the PI calculation so as to match the d-axis current detection value Id_sns and the q-axis current detection value Iq_sns to be the d-axis current command value and the q-axis current command value, respectively, that is, to set the current deviations ΔId and ΔIq to be zero. The voltage command value calculation unit 63 calculates the d-axis voltage command value Vd and the q-axis voltage command value Vq, which are the target values of the output voltage of the inverter circuit 70.

Further, the voltage command value calculation unit 63 of the present embodiment uses the inverter input voltage Vin to convert the dq axis voltage command values Vd* and Vq* into the dq axis duty ratio command values Dd* and Dq* according to the equations (1.1) and (1.2).

(Equation 1.1 and 1.2)

$$Dd^* = K \times \frac{Vd^*}{Vin} \quad (1.1)$$

$$Dq^* = K \times \frac{Vq^*}{Vin} \quad (1.2.)$$

The dq-axis duty ratio command values Dd* and Dq* are correlation values of the dq-axis voltage command values Vd* and Vq*. In the present embodiments, the dq-axis duty ratio command values Dd* and Dq* includes a broad sense, and interpreted as "dq axis voltage command value". Therefore, the portion from the input of the current deviations ΔId and ΔIq to the output of the dq axis duty ratio command values Dd* and Dq* is referred to as the "voltage command value calculation unit 63".

The voltage command upper limit guard unit 67 guards the upper limit of the absolute value of the d-axis duty ratio command value Dd* and the q-axis duty ratio command value Dq* by the voltage command upper limit guard value, and outputs the dq-axis duty ratio command values Dd and Dq after guarding.

For example, the voltage command upper limit guard unit 67 calculates the d-axis duty ratio command value Dd after guarding, and then, calculates the q-axis duty ratio command value Dq after guarding by multiplying the saturation guard calculation coefficient based on the d-axis duty ratio command value Dd after guarding. At this time, the voltage command upper limit guard unit 67 may calculate the q-axis duty ratio command value Dq by polynomial calculation for the d-axis duty ratio command value Dd** after guarding. In the polynomial calculation, for example, the value obtained by adding the 0th to 3rd order terms is calculated.

The two-phase three-phase conversion unit 68 uses the electric angle θ to convert the duty ratio command values Dd and Dq after guarding into the three-phase duty ratio command values Du*, Dv*, and Dw* by two-phase and three-phase coordinate conversion. The PWM control unit 69 generates a voltage pulse signal as a drive signal based on the three-phase duty ratio command values Du*, Dv, and Dw*, and commands the inverter circuit 70. By switching the inverter circuit 70 according to the drive signal, an output voltage corresponding to the voltage command value is applied to the motor 80.

The target allowable electric power calculation unit 41 calculates the target allowable electric power Pinv_lim, which is the upper limit allowable value of the inverter electric power to be output by the inverter circuit 70. During normal control, a predetermined target allowable electric power Pinv_lim is output. The operation during backup control will be described later.

The current limit value calculation unit 43 obtains a d-axis duty ratio command value Dd* before guarding as a d-axis voltage command value, a q-axis duty ratio command value Dq* as a q-axis voltage command value, a d-axis current detection value Id_sns, a target allowable electric power Pinv_lim, and the inverter input voltage Vin. Information on the q-axis current detection value Iq_sns may not be necessary, so it is indicated by a broken line. Based on this information, the current limit value calculation unit 43 calculates the q-axis current limit value Iq_lim so that the inverter electric power is equal to or less than the target allowable electric power Pinv.

The inverter electric power Pinv is represented by the equation (2) using the equations (1.1) and (1.2).

(Equation 2)

$$Pinv = Vd^* \times Id + Vq^* \times Iq = \left(\frac{Dd^*}{K} \times Id + \frac{Dq^*}{K} \times Iq\right) \times Vin \quad (2)$$

Here, the d-axis current Id of the equation (2) is the detected value Id_sns and the q-axis current Iq is the q-axis current limit value Iq_lim, so that the equation (3) is obtained. By rearranging the equation (3), the equation (4) for the q-axis current limit value Iq_lim is obtained.

(Equations 3 and 4)

$$Pinv\_lim = \left(\frac{Dd^*}{K} \times Id\_sns + \frac{Dq^*}{K} \times Iq\_lim\right) \times Vin \quad (3)$$

$$Iq\_lim = \left(\frac{Pinv\_lim}{Vin} - \frac{Dd^*}{K} \times Id\_sns\right) \times \frac{K}{Dq^*} \quad (4)$$

Next, a backup control configuration peculiar to the present embodiment will be described. The target allowable electric power calculation unit 41 acquires the charge amount and temperature of the backup power supply 20. The target allowable electric power calculation unit 41 may acquire the charge amount as a multi-step charge amount level, or may acquire the temperature as a low temperature flag that is turned on when the temperature is equal to or lower than a predetermined temperature.

When the target allowable electric power calculation unit 41 receives the notification of the backup state, it switches to the backup control and sets the target allowable electric power Pinv_lim to a value smaller than that in the normal control. Further, the target allowable electric power calculation unit 41 variably sets the target allowable electric power Pinv_lim according to the charge amount or temperature of the backup power supply 20 at the time of backup control. The specific setting method will be described later with reference to FIG. 8.

Further, a filter ("LPF" in the drawing) 42 for suppressing a sudden change in the target allowable electric power Pinv_lim at the start of backup control is provided on the output side of the target allowable electric power calculation unit 41.

Further, the drive control unit 401 has an upper limit guard value restriction rate calculation unit 65. The upper limit guard value restriction rate calculation unit 65 acquires the notification of the backup state, the charge amount and the temperature of the backup power supply 20. The upper limit guard value restriction rate calculation unit 65 may acquire the charge amount as a multi-step charge amount level, or may acquire the temperature as a low temperature flag that is turned on when the temperature is equal to or lower than a predetermined temperature.

The upper limit guard value restriction rate calculation unit 65 calculates the upper limit guard value restriction rate α, which is the "restriction ratio of the voltage command upper limit guard value during backup control with respect to the voltage command upper limit guard value during normal control". At the time of normal control, the upper limit guard value restriction rate calculation unit 65 sets the upper limit guard value restriction rate α to 1.

When the notification of the backup state is received, the upper limit guard value restriction rate calculation unit 65 switches to the backup control, and sets the upper limit guard value restriction rate α to a value larger than 0 and smaller than 1, that is, a value smaller than that in the normal control. Further, the upper limit guard value restriction rate calculation unit 65 variably sets the upper limit guard value restriction rate α according to the charge amount or temperature of the backup power supply 20 during backup control. The specific setting method will be described later with reference to FIG. 9.

Further, a filter ("LPF" in the drawing) 66 for suppressing a sudden change in the upper limit guard value restriction rate α at the start of backup control is provided on the output side of the upper limit guard value restriction rate calculation unit 65.

The upper limit guard value restriction rate α set by the upper limit guard value restriction rate calculation unit 65 is input to the voltage command upper limit guard unit 67. During backup control, the voltage command upper limit guard unit 67 guards the upper limit of the absolute values of the d-axis duty ratio command value Dd* and the q-axis duty ratio command value Dq* by the voltage command upper limit guard value multiplied by the restriction factor α, and outputs the dq axis duty ratio command values Dd and Dq after guarding. This directly restricts the electric power consumption.

Figure 6:
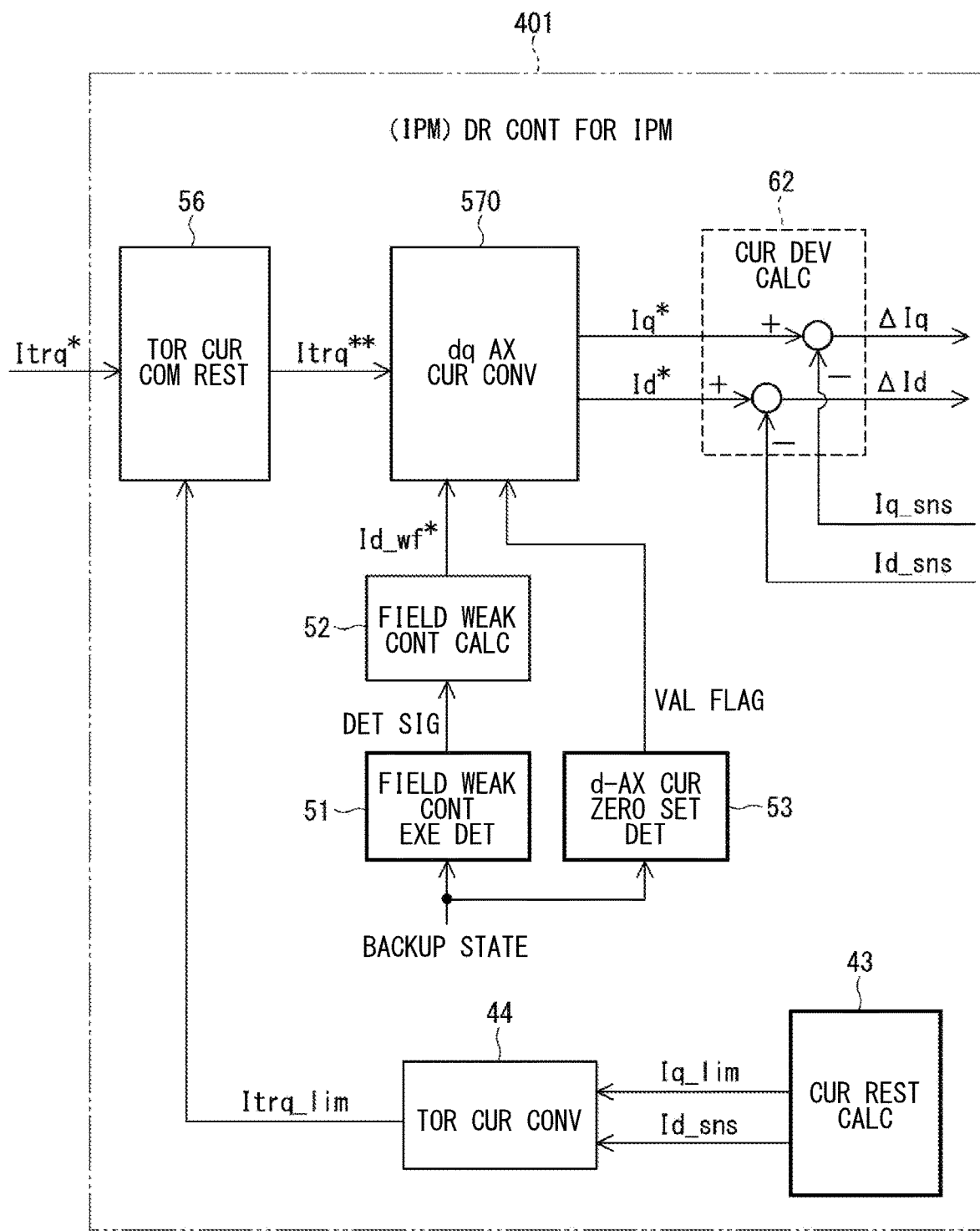
FIG. 6 is a block diagram of a current command calculation unit for an IPM motor in the drive control unit of the first embodiment.

Subsequently, with reference to FIG. 6, the configuration of the current command calculation unit for the IPM motor in the drive control unit 401 of the first embodiment will be described. The drive control unit 401 includes a torque current conversion unit 44, a torque current command value restriction unit 56, a field weakening control calculation unit 52, and a dq axis current conversion unit 570 as a normal control configuration. In an IPM motor that generates a reluctance torque that depends on both the d-axis current Id and the q-axis current Iq, it is effective to use a torque current that is proportional to the torque of the motor 80. Patent Literature 2 is referred to for details of the torque current conversion unit 44, the torque current command value restriction unit 56, and the dq axis current conversion unit 570.

The torque current conversion unit 44 converts the q-axis current restriction value Iq_lim into the torque current restriction value Itrq_lim using the d-axis current detection value Id_sns. The torque current restriction value Itrq_lim is a value that reflects the target allowable electric power Pinv_lim. Therefore, when the target allowable electric power Pinv_lim is restricted during the backup control, the torque current limit value Itrq_lim is also restricted. A filter may be provided after the torque current conversion unit 44.

The torque current command value restriction unit 56 compares the torque current command value Itrq* converted from the torque command value required for the motor with the torque current limit value Itrq_lim, and outputs the smaller value as the torque current command value Itrq**. That is, when "Itrq*<Itrq_lim", the torque current command value restriction unit 56 outputs the input torque current command value Itrq* as it is. On the other hand, when "Itrq*≥Itrq_lim", the torque current command value restriction unit 56 outputs the torque current restriction value Itrq_lim.

The field weakening control calculation unit 52 calculates the d-axis current command value Id_wf* for field weakening control according to the rotation speed of the motor 80 and the degree of saturation with respect to the maximum applied voltage. By performing the field weakening control that increases the absolute value of the negative d-axis current when the motor rotates at high speed, it is possible to prevent the current from becoming difficult to flow in the motor winding due to the counter electromotive force.

The dq-axis current conversion unit 570 acquires the restricted torque current command value Itrq** and the restricted d-axis current command value Id_wf*, and converts them into the d-axis current command value Id* and the q-axis current command value Iq*. The d-axis current command value Id* and the q-axis current command value Iq* are input to the current deviation calculation unit 62 as feedback control command values. The restriction of the target allowable electric power Pinv_lim is reflected to the restriction of the dq axis current command values Id* and Iq* through the restriction of the torque current command value Itrq*. Therefore, the electric power consumption is restricted.

Further, the drive control unit 401 has a field weakening control execution determination unit 51 and a d-axis current zero setting determination unit 53 as a backup control configuration. The field weakening control execution determination unit 51 determines whether or not the field weakening control is executed. When the field weakening control that increases the absolute value of the d-axis current command value Id* is performed, the electric power consumption increases. Therefore, in the backup state, the electric power consumption is further restricted by not executing the field weakening control.

Here, in the electric power steering device of Patent Literature 1, priority is given to ensuring steering operability when using a backup power supply, and conversely, the absolute value of the d-axis current is increased. This is due to the difference in the point of view of what is given the highest priority. In the first place, backup control performed in an emergency may not satisfy all the requirements. Even if the steering operability is ensured, it is meaningless if the system is stopped. Focusing on this point, in the present embodiment, the highest priority is given to avoiding the shutdown of the backup power supply 20.

The d-axis current zero setting determination unit 53 determines whether or not to set the d-axis current command value Id* to 0 A (zero amperes, the same applies hereinafter). Even if the field weakening control is not executed, the absolute value of the d-axis current command value Id* is only reduced, and it is not always 0 A. Therefore, the d-axis current zero setting determination unit 53 forcibly turns on the valid flag for setting to "Id*=0 A" in the backup state. This further restricts the electric power consumption.

As described above, the drive control unit 401 of the first embodiment totally restricts the electric power consumption by executing multiple power restrictions in multiplex during backup control in the target allowable electric power calculation unit 41, the upper limit guard value restriction rate calculation unit 65, the field weakening control execution determination unit 51, and the d-axis current zero setting determination unit 53. Therefore, it is possible to avoid the loss of the motor output function due to the stoppage of the backup power supply 20. Specifically, in the EPS system 901, it is possible to avoid the failure of the steering assist function due to the drive stop of the steering assist motor 801. In the SBW system 902, it is possible to avoid the failure of the reaction force presentation function due to the drive stop of the reaction force motor 802 and the failure of the steering function due to the drive stop of the steering motor 803. Therefore, the reliability of the steering system of the vehicle is improved.

Further, in the system to which the motor control device 300 of the present embodiment is applied, backup control can be realized with a low-capacity backup power supply 20, so that the size and cost of the backup power supply 20 can be reduced.

Next, the transition process to the backup control in the drive control unit 401 will be described with reference to the flowchart of FIG. 7 and FIGS. 8 and 9. In S10, it is determined whether the backup status is set, that is, whether the backup status notification signal is received. When YES in S10, four items S11, S12, S13, and S15 are executed as backup control in the first embodiment. In the second embodiment described later, three items except S15 are executed. The order of these executions may be any order.

In S11, the target allowable electric power calculation unit 41 variably sets the target allowable electric power Pinv_lim according to the charge amount and temperature of the backup power supply 20. As shown in FIG. 8, the smaller the charge amount is, the lower the target allowable electric power Pinv_lim is set. Further, when the temperature T2 is lower than the normal temperature T1, the target allowable electric power Pinv_lim is set lower.

In S12, the upper limit guard value restriction rate calculation unit 65 variably sets the upper limit guard value restriction rate α in the range of "0<α<1" according to the charge amount and temperature of the backup power supply 20. As shown in FIG. 9, the smaller the charge amount is, the lower the upper limit guard value restriction rate α is set. Further, when the temperature T2 is lower than the normal temperature T1, the upper limit guard value restriction rate α is set lower.

Figure 8:
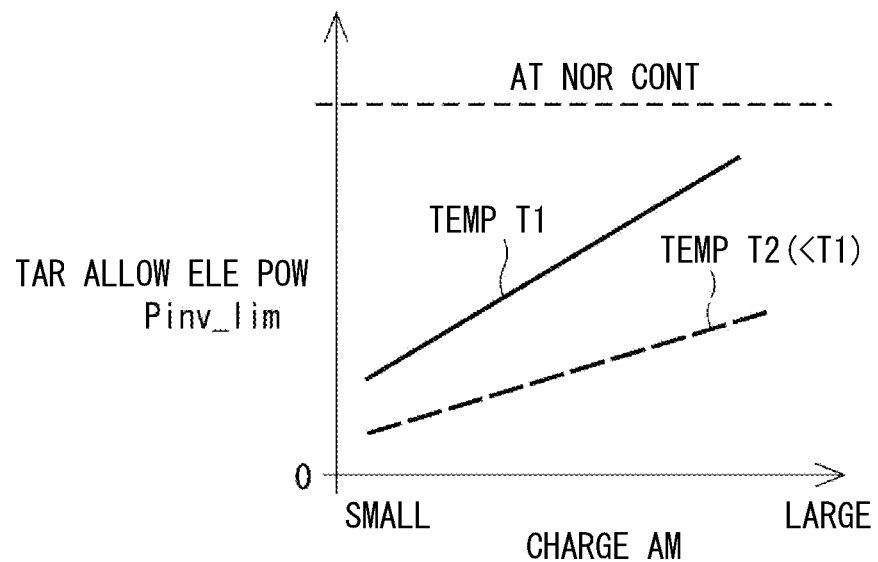
FIG. 8 is a map showing the relationship between the charge amount and temperature of the backup power supply and the target allowable electric power.
Figure 9:
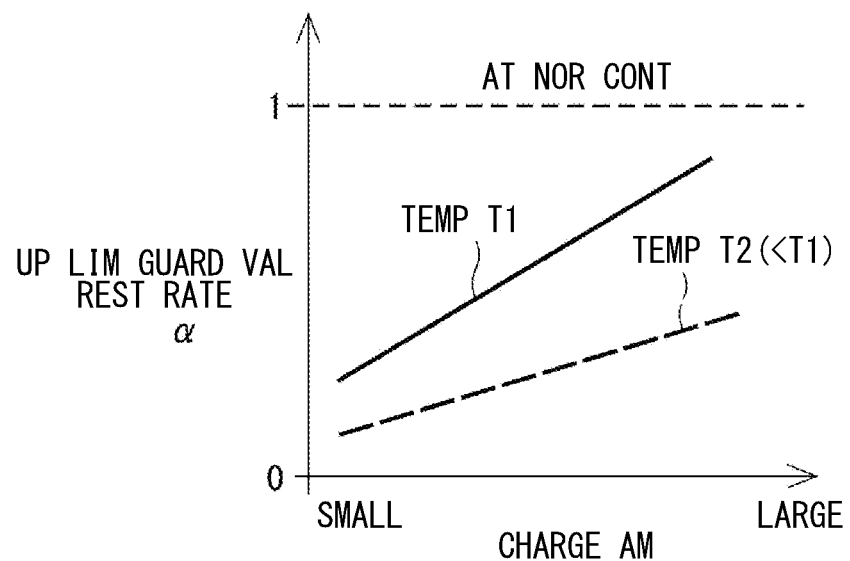
FIG. 9 is a map showing the relationship between the charge amount and temperature of the backup power supply and the upper limit guard value limiting rate.

In FIGS. 8 and 9, the target allowable electric power Pinv_lim and the upper limit guard value restriction rate α may be changed stepwise by using the multi-step charge amount level. Further, the map for the charge amount may be switched between when the low temperature flag is off and when it is on. By restricting the output values to a numerical number of discrete values, the calculation load is reduced.

In S13, the field weakening control execution determination unit 51 determines that the field weakening control execution is not performed. In S14, it is determined whether the drive target is an IPM motor. In the case of the first embodiment, YES is determined in S14, and the d-axis current zero setting determination unit 53 in S15 turns on the valid flag for setting to "Id*=0 A".

On the other hand, when NO in S10, S21 and S22 are executed as normal control. The execution order of S21 and S22 may be any order. In S21, the target allowable electric power calculation unit 41 sets the target allowable electric power Pinv_lim to the value at the time of normal control. In S22, the upper limit guard value restriction rate calculation unit 65 sets the upper limit guard value restriction rate α to 1.

Second Embodiment

Figure 10:
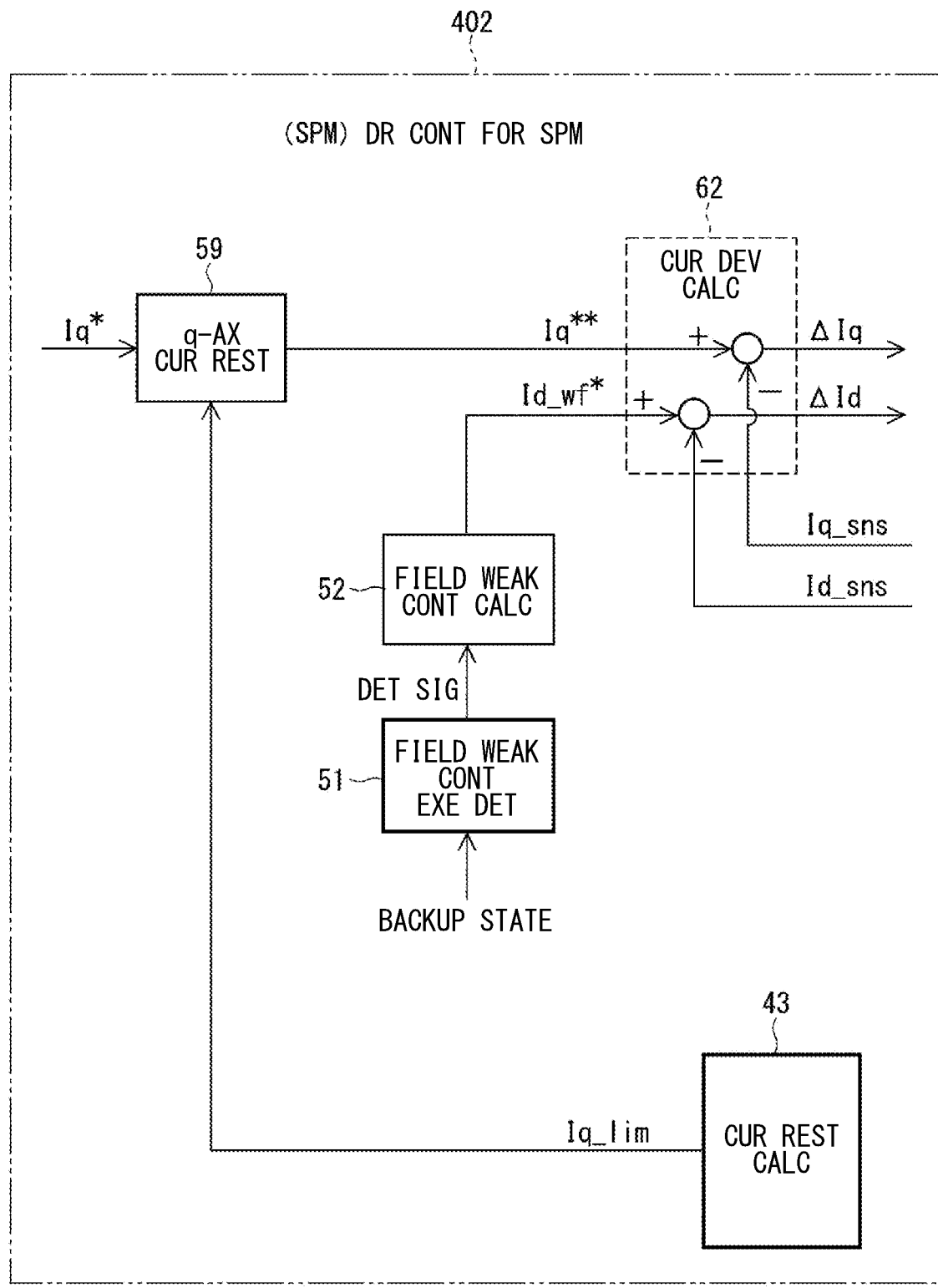
FIG. 10 is a block diagram of a current command calculation unit for an SPM motor in the drive control unit of the second embodiment.

With reference to FIG. 10, the configuration of the current command calculation unit for the SPM motor in the drive control unit 402 of the second embodiment will be described. In FIG. 10, substantially the same configuration as in FIG. 6 is designated by the same reference numerals and description thereof will be omitted. Regarding the configuration of the feedback control unit in the drive control unit 402, FIG. 5 is referred to in common with the first embodiment.

In the drive control unit 402 for SPM, the q-axis current restriction value Iq_lim calculated by the current restriction value calculation unit 43 is input to the q-axis current restriction unit 59. The q-axis current restriction unit 59 compares the q-axis current command value Iq* before the restriction with the q-axis current limit value Iq_lim, and sets the smaller value as the q-axis current command value Iq** after the restriction, and outputs it to the current deviation calculation unit 62.

As for the d-axis current command value, the field weakening control execution determination unit 51 and the field weakening control calculation unit 52 are provided as in the drive control unit 401 of the first embodiment. The d-axis current command value Id_wf* for the field weakening control calculated by the field weakening control calculation unit 52 is input to the current deviation calculation unit 62.

Regarding the transfer of control in the backup state in the second embodiment, S11, S12, and S13 in FIG. 8 are the same as those in the first embodiment. In the second embodiment in which the SPM motor is the drive target, since it is determined as NO in S14, S15 is skipped. In the second embodiment as well, by restricting the electric power consumption during backup control as in the first embodiment, it is possible to avoid the loss of the motor output function due to the stoppage of the backup power supply 20.

Figure 7:
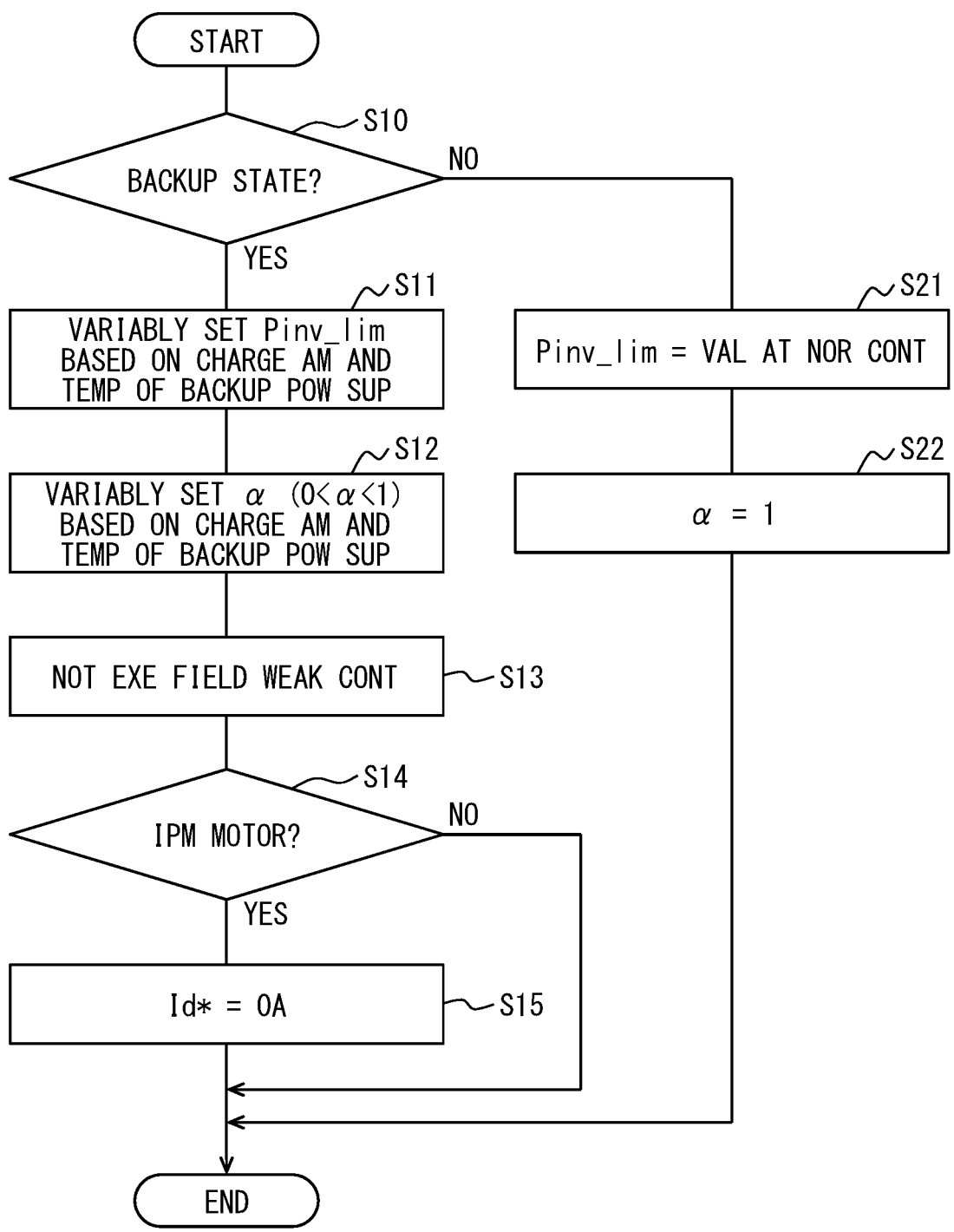
FIG. 7 is a flowchart of a transition process to backup control.

Other Embodiments (A) In the flowchart of FIG. 7, during backup control, power restrictions of 4 items in the first embodiment and 3 items in the second embodiment are executed. Not limited to this, only one or more steps including at least one of the target allowable electric power Pinv_lim and the upper limit guard value restriction rate α may be executed. By executing at least a part of the power restriction, it is possible to avoid the loss of the motor output function due to the stoppage of the backup power supply 20.

(B) At the time of backup control, the target allowable electric power calculation unit 41 may variably set the target allowable electric power Pinv_lim using only the information of either the charge amount or the temperature of the backup power supply 20. Alternatively, during backup control, the target allowable electric power calculation unit 41 may set the target allowable electric power Pinv_lim to a fixed value smaller than the value at the time of normal control.

Similarly, during backup control, the upper limit guard value restriction rate calculation unit 65 may set the upper limit guard value restriction rate α variably using only information on either one of the charge amount and the temperature of the backup power supply 20. Alternatively, during backup control, the upper limit guard value restriction rate calculation unit 65 may set the upper limit guard value restriction rate α to a fixed value larger than 0 and smaller than 1.

(C) When the influence of the sudden change in the electric power restriction at the start of the backup control is not taken into consideration, the filters 42 and 66 may not be provided on the output side of the target allowable electric power calculation unit 41 or the output side of the upper limit guard value restriction rate calculation unit 65.

(D) In the configuration example shown in FIG. 3, the backup power supply device 200 notifies the drive control unit 40 of the motor control device 300 of the backup state, the charge amount, and the temperature. Alternatively, the functional arrangements relating to the determination of various information and notifications may not be limited to these features. The transition to backup control may be determined based on the current and voltage values detected by the motor control device 300. For example, the power supply switching determination unit 25 may be provided inside the motor control device 300. In that case, the motor control device 300 monitors the voltage Vbtm of the main power supply 10 and switches from the main power supply 10 to the backup power supply 20 when the voltage drops.

(E) The charge amount of the backup power supply 20 at the time of backup control may not be limited to the power supply current Ibtbu, and may be determined based on the battery capacity of the backup power supply 20. In that case, the charge amount backup power supply device 200 continuously detects the battery capacity after the start of the backup control, converts it into the charge amount, and notifies the drive control unit 40 of the motor control device 300. The drive control unit 40 sets the target allowable electric power Pinv_lim and the upper limit guard value restriction rate α accordingly.

(F) The motor control device of the present embodiments may not be limited to the steering system of EPS or SBW, and may be applied to any motor drive system configured to be able to switch between the main power supply 10 and the backup power supply 20.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control device for driving a motor by an electric power of a main power supply or a backup power supply in a system configured to be switchable between the main power supply as a direct current power supply having a large capacity and the backup power supply as a direct current power supply having a small capacity using a power supply switching determination unit, the motor control device comprising:
   an inverter circuit that converts a direct current electric power from the main power supply or the backup power supply into an alternating current electric power, and supplies to the motor; and a drive control unit that outputs a drive signal, which is obtained by a feedback control of a current detection value with respect to a current command value, wherein:
   the drive control unit includes:
   a current detection value conversion unit that performs coordinate conversion of a detection value of a phase current flowing from the inverter circuit to the motor, and calculates a d-axis current detection value and a q-axis current detection value;
   a voltage command value calculation unit that calculates a voltage command value to be applied to the inverter circuit or a d-axis voltage command value and a q-axis voltage command value as correlation values of the voltage command value so that the d-axis current detection value and the q-axis current detection value follow a d-axis current command value and a q-axis current command value, respectively; and
   a voltage command upper limit guard unit that guards an upper limit of an absolute value of each of the d-axis voltage command value and the q-axis voltage command value by a voltage command upper limit guard value; and
   when the power supply switching determination unit switches from the main power supply to the backup power supply, the drive control unit shifts from a normal control, executed when the main power supply is used, to a backup control that prevents the backup power supply from stopping by restricting an electric power consumption.

2. The motor control device according to claim 1, wherein:
   the drive control unit further includes:
   a target allowable electric power calculation unit that calculates a target allowable electric power, which is an upper limit allowable value of an inverter electric power output by the inverter circuit; and
   a current limit value calculation unit that calculates a q-axis current restriction value so that the inverter electric power calculated from the d-axis voltage command value, the q-axis voltage command value, the d-axis current detection value, and the q-axis current detection value is equal to or less than the target allowable electric power; and
   the target allowable electric power calculation unit sets the target allowable electric power during the backup control to be smaller than the normal control.

3. The motor control device according to claim 1, wherein:
   the drive control unit further includes:
   an upper limit guard value restriction rate calculation unit that calculates an upper limit guard value restriction rate which is a restriction ratio of the voltage command upper limit guard value in the backup control with respect to the voltage command upper limit guard value in the normal control; and
   the upper limit guard value restriction rate calculation unit sets the upper limit guard value restriction rate to be larger than 0 and smaller than 1 during the backup control.

4. The motor control device according to claim 2, wherein:
   the target allowable electric power calculation unit variably sets the target allowable electric power according to a charge amount or temperature of the backup power supply during the backup control.

5. The motor control device according to claim 3, wherein:
   the upper limit guard value restriction rate calculation unit variably sets the upper limit guard value restriction rate according to a charge amount or temperature of the backup power supply during the backup control.

6. The motor control device according to claim 4, wherein:
   the charge amount of the backup power supply is determined based on a power supply current flowing from the backup power supply to the inverter circuit.

7. The motor control device according to claim 2, further comprising:
   a filter that suppresses a sudden change in the target allowable electric power at a start of the backup control and is disposed on an output side of the target allowable electric power calculation unit.

8. The motor control device according to claim 3, further comprising:
   a filter that suppresses a sudden change in the upper limit guard value restriction rate at a start of the backup control, and is disposed on an output side of the upper limit guard value restriction rate calculation unit.

9. The motor control device according to claim 2, wherein:
   the drive control unit further includes a field weakening control execution determination unit that determines an execution or non-execution of a field weakening control; and
   the field weakening control execution determination unit does not perform the field weakening control during the backup control.

10. The motor control device according to claim 2, wherein:
    the motor is an IPM motor;
    the drive control unit further includes a d-axis current zero setting determination unit that determines whether to set the d-axis current command value to zero; and
    the d-axis current zero setting determination unit sets the d-axis current command value to zero during the backup control.

11. The motor control device according to claim 1, wherein:
    the power supply switching determination unit switches from the main power supply to the backup power supply based on a power supply voltage of the main power supply.

12. A steering system comprising:
    a steering assist motor that outputs a steering assist torque, a reaction force motor that outputs a reaction torque to a driver's steering operation, or a turning motor that turns a tire of a vehicle; and the motor control device according to claim 1 that controls a drive of at least one of the steering assist motor, the reaction force motor, or the turning motor as the motor.

\* \* \* \* \*